United States Patent
Hill et al.

(10) Patent No.: US 6,963,991 B2
(45) Date of Patent: Nov. 8, 2005

(54) SYNCHRONIZING AND ALIGNING DIFFERING CLOCK DOMAINS

(75) Inventors: Kevin M. Hill, Folsom, CA (US);
Chris D. Matthews, Sacramento, CA (US); Amir A. Bashir, El Dorado Hills, CA (US); Kevin E. Arendt, Folsom, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 498 days.

(21) Appl. No.: 10/160,621

(22) Filed: May 31, 2002

(65) Prior Publication Data
US 2003/0226052 A1 Dec. 4, 2003

(51) Int. Cl.[7] ............................... G06F 1/04
(52) U.S. Cl. ....................................... 713/500
(58) Field of Search ........................... 713/500

(56) References Cited
U.S. PATENT DOCUMENTS
6,608,528 B2 * 8/2003 Tam et al. .................. 331/2

2002/0078273 A1 * 6/2002 Jacobs ......................... 710/62
2002/0112136 A1 * 8/2002 Fujii .......................... 711/167

OTHER PUBLICATIONS

INTEL, Intel 830 Chipset Platform Design Guide, Jan. 2002, Order No.:298339–003.

* cited by examiner

Primary Examiner—John R. Cottingham
(74) Attorney, Agent, or Firm—Blakely, Sokoloff, Taylor & Zafman LLP

(57) ABSTRACT

Embodiments of the invention relate to a memory control hub (MCH) clock master of an MCH. Typically, in a computer system, a processor is coupled to the MCH by a front-side bus (FSB). Further, an input/output control hub (ICH) is typically coupled to the MCH by a back-side bus or Hub Link. In one embodiment, a host phase locked loop (HPLL) of the MCH clock master receives an FSB clock signal transmitted on the FSB and generates a local synchronous clock signal based upon the FSB clock signal. A delayed lock loop (DLL) of the MCH clock master also receives the FSB clock signal and generates a system clock signal. Particularly, the DLL synchronizes the system clock signal to the local synchronous clock and drives the system clock signal to many different devices on the board.

24 Claims, 4 Drawing Sheets

SYNCHRONIZING AND ALIGNING DIFFERING CLOCK DOMAINS

BACKGROUND

1. Field

Embodiments of the invention relate to the field of system clock architectures. More particularly, embodiments of the invention relate to synchronizing and aligning differing clock domains.

2. Description of Related Art

As computer devices and systems continue to advance and become more complex, effective and efficient techniques for transferring data between various components in computer systems have become more and more critical in computer system design and implementation. In particular, techniques to increase data transfer rates between input/output (I/O) devices (e.g. often controlled through an I/O control hub) and system memory (e.g. often controlled through a memory control hub) are continuously under examination in order to improve the overall performance of computer systems.

This is particularly true for the personal computer industry. For example, in today's competitive marketplace for personal computers, computer speed for the rendering of graphics has become one of the key consumer considerations in purchasing a new personal computer. The speed of a personal computer in rendering graphics has a direct impact on the performance of the main functions that a typical computer user wishes to utilize their computer for, such as: games, Internet surfing, application software programs, and a myriad of other computer uses most all of which depend on the speedy rendering of graphics.

Many of today's computer systems include a processor coupled to a memory controller hub (MCH) by a front-side bus (FSB) wherein system memory is coupled to the MCH. Further, I/O devices are coupled through an I/O control hub (ICH) to the MCH by a back-side bus (BSB). The computer's speed and performance, especially for the rendering of graphics, is often tied to the rate of data transfer between the processor and the MCH along the FSB and between the system memory of the MCH and I/O devices along the BSB. The rate of data transfer along the front-side bus is based upon the clock speed (e.g. measured in MHz) of the front-side bus, which is calibrated by a FSB clock signal. Similarly, the rate of data transfer along the backside bus is based upon the clock speed (e.g. measured in MHz) of the back-side bus, which is calibrated by a BSB clock signal. Unfortunately, typically, the clock speeds for the transfer of data along the front-side bus and back-side bus are not synchronized and/or aligned resulting in serious inefficiencies.

DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Embodiments of the invention relate to a memory control hub (MCH) clock master of an MCH. Typically, in a computer system, a processor is coupled to the MCH by a front-side bus (FSB). Further, an input/output control hub (ICH) is typically coupled to the MCH by a back-side bus or Hub Link. In one embodiment, a host phase locked loop (HPLL) of the MCH clock master receives an FSB clock signal transmitted on the FSB and generates a local synchronous clock signal based upon the FSB clock signal. A delayed lock loop (DLL) of the MCH clock master also receives the FSB clock signal and generates a system clock signal. Particularly, the DLL synchronizes the system clock signal to the local synchronous clock and drives the system clock signal to the Hub Link, an external buffer clock chip, and to common frequency devices on the board.

Thus, the MCH through the MCH clock master establishes an MCH local synchronous clock and becomes the clock master for the Hub Link. In this way, there is a known and deterministic phase relationship between the FSB, the local synchronous clock of the MCH, and the Hub Link. Accordingly, synchronous and phase aligned data transfer can be accomplished between system memory of the MCH, the ICH, and an AGP as they are all based on a common clock, resulting in efficient data transfer between these components.

Figure 1:
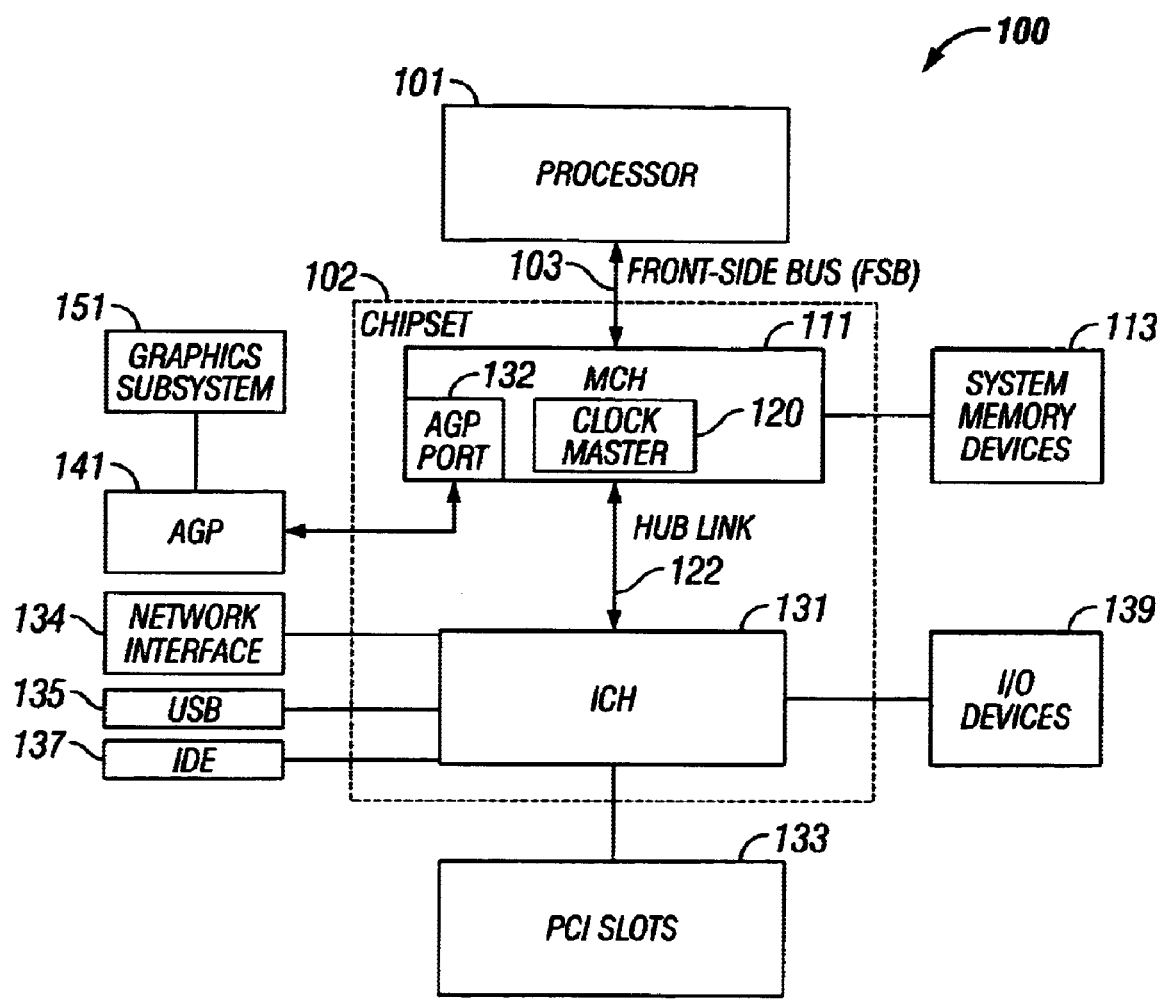
FIG. 1 shows a block diagram of an illustrative embodiment of an exemplary system configuration in which the teachings of the embodiments of the invention can be practiced.

FIG. 1 shows a block diagram of an illustrative embodiment of an exemplary system configuration 100 in which the teachings of the embodiments of the invention can be practiced. The system configuration 100 includes at least one processor 101 such as a central processing unit (CPU), a memory control hub (MCH) 111, system memory devices 113, an Input/Output (I/O) control hub (ICH) 131, a graphics controller 141 coupled to a graphics subsystem 151. Also, as will be discussed in more detail later, the MCH 111 includes an MCH clock master 120 according to one embodiment of the invention. The combination of the MCH 111 and ICH 131 is sometimes termed a chipset 102.

The CPU 101 is coupled to the MCH 111 by the front-side bus (FSB) 103 and the MCH 111 is coupled to the ICH 131 by the Hub Link 122 (sometimes referred to as the back-side bus). Further, the MCH 111 is directly coupled through the AGP port 132 to the AGP 141. Moreover, the exemplary system 100 typically includes a clock chip (not shown) to provide FSB and BSB clock signals and to buffer other clocks. An example of a clock chip will be discussed with reference to FIG. 2.

For the purposes of the present specification, the term "processor" or "CPU" refers to any machine that is capable of executing a sequence of instructions and shall be taken to include, but not be limited to, general purpose microprocessors, special purpose microprocessors, application specific integrated circuits (ASIC), multi-media controllers, signal processors and microcontrollers, etc. In one embodiment, the CPU 101 is a general-purpose microprocessor that is capable of executing an Intel Architecture instruction set. For example, the CPU 101 can be one of the PENTIUM classes of processors or one of the CELERON classes of processors.

The CPU 101, the ICH 131, and advance graphics control port (AGP) graphics control unit 141 access the system memory devices 161 via the MCH 111. The MCH 111, in one embodiment, is responsible for servicing all memory transactions that target the system memory devices 113. The MCH 111 can be a stand-alone unit, an integrated part of a chipset, or a part of some larger unit that controls the interfaces between various system components and the system memory devices 113.

The system memory devices 113 can include any memory device adapted to store digital information, such as static random access memory (SRAM), dynamic random access memory (DRAM), synchronous dynamic random access memory (SDRAM), and double data rate (DDR) SDRAM or DRAM, etc. Thus, in one embodiment, system memory devices 113 include volatile memory. Further, system memory devices 113 can also include non-volatile memory such as read-only memory (ROM).

The ICH 131 provides the interface control between the MCH 111 and various I/O devices and ports including peripheral component interconnect (PCI) slots and PCI agents 133, a network interface 134, at least one USB port 135, at least one integrated drive electronic (IDE) device 137 (e.g. a hard drive), and other I/O devices 139. Examples of I/O devices 139 may include any I/O devices to perform I/O functions. For example, I/O devices may include a monitor, a keypad, a modem, a printer, storage devices (e.g. Compact Disk ROM (CD ROM), Digital Video Disk (DVD), hard drive, floppy drive, etc.) or any other types of I/O devices, e.g., controllers for input devices (mouse, trackball, pointing device), media cards (e.g. audio, video, graphics), etc.

The ICH 131, in one embodiment, contains an IDE host interface unit that controls the interface between the IDE devices 137 and the MCH 111. The AGP graphics control unit 141 provides the interface control between a graphics subsystem 151 and the MCH 111. In one embodiment, the system configuration 100 can be an ALMADOR GMCH (i830M) platform.

It should be appreciated that the FIG. 1 system configuration 100 is only an exemplary illustration of an environment in which embodiments of the invention can be practiced. Further, those skilled in the art will recognize that the exemplary environment illustrated in FIG. 1 is not intended to limit embodiments of the invention.

Figure 2:
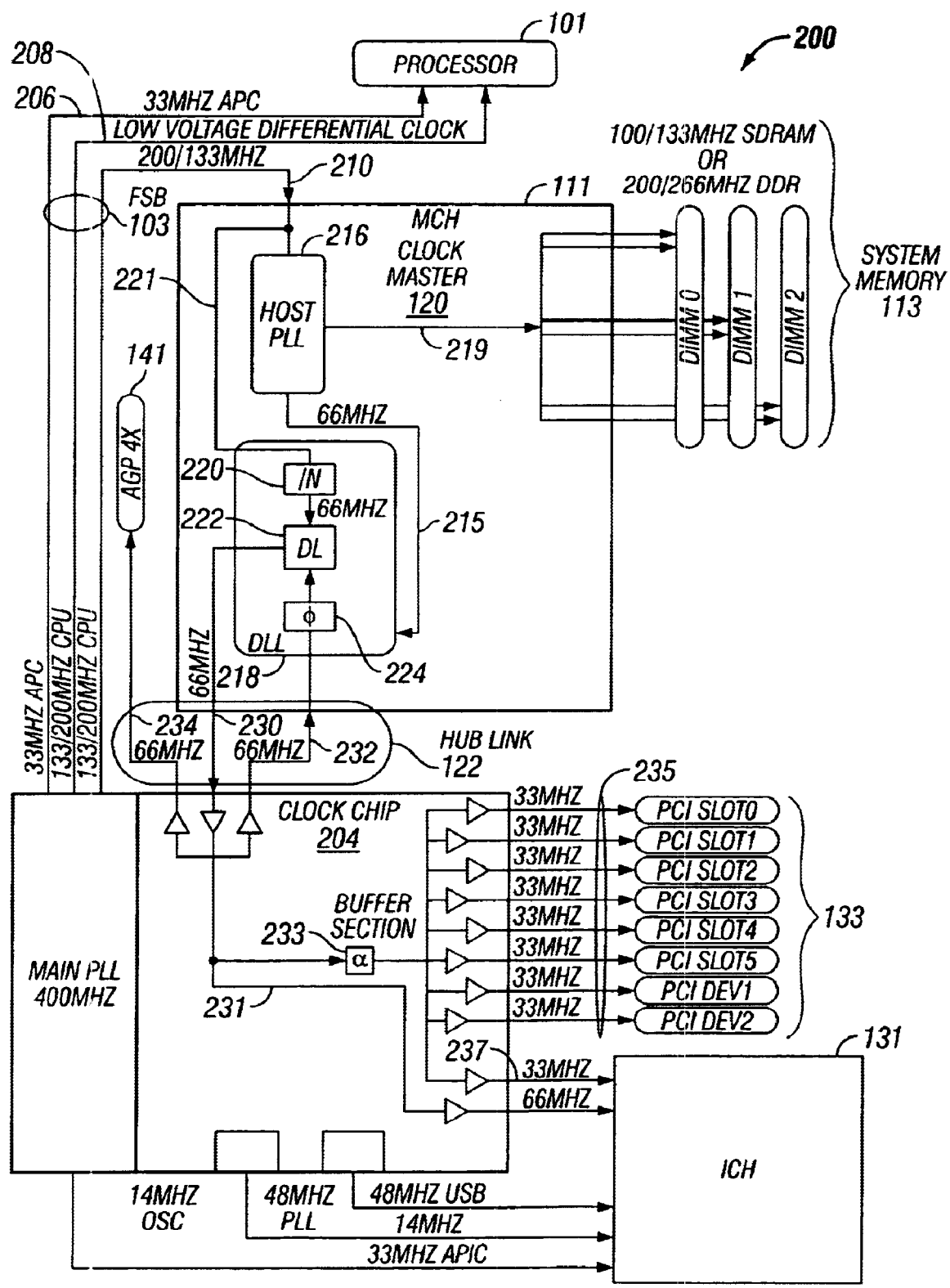
FIG. 2 illustrates a system clock diagram of an MCH clock master of an MCH according to one embodiment of the invention, as well as other components of the exemplary system configuration of FIG. 1.

With reference now to FIG. 2, FIG. 2 illustrates a system clock diagram 200 of an MCH clock master 120 of the MCH 111 according to one embodiment of the invention, as well as other components of the exemplary environmental system configuration 100 illustrated in FIG. 1. As shown in FIG. 2, an advanced programmable interrupt controller (APIC) signal 206 is routed to the processor 101 along the FSB 103. Further, a pair of processor FSB differential clock signals 208 are routed to the processor 101 along the FSB 103 and a pair of MCH FSB differential clock signals 210 are routed to the MCH 111 along the FSB 103. In this example, the pair of differential clock signals can operate at 133 or 200 MHz, respectively. By the processor 101 and the MCH 111 utilizing the same pair of differential clock signals (e.g. 133 or 200 MHz) synchronous and deterministic transfers between these two devices on the FSB 103 can be accomplished. In the same exemplary system configuration 100, communication between the ICH 131 and the MCH 111 along the Hub Link 122 is synchronized using a single ended clock (e.g. 66 MHz). Typically, Hub Link 122 refers to the set of data and control connections between the MCH 111 and the ICH 131.

In order to increase the efficiency and reliability of data transfer between the ICH 131 (and I/O devices attached thereto), the AGP 141, and system memory 113, embodiments of the invention relate to enabling the MCH 111 to have a known and synchronous clocking relationship between the Hub Link 122 and the FSB 103. To accomplish this, the MCH 111 through MCH clock master 120 establishes an MCH local synchronous clock and becomes the clock master of a clock chip 204 for the Hub Link 122. In one embodiment, the clock chip 204 is an external clock buffer chip. Further, in one embodiment, the clock chip 204 can be a CK-TITAN clock chip. In this way, there is a known and deterministic phase relationship between the FSB 103, the local synchronous clock of the MCH 111, and the Hub Link 122, as will be discussed. Thus, synchronous and phase aligned data transfer can be accomplished between the system memory 113 of the MCH 111, the ICH 131, and the AGP 141 as they are all based on a common clock, resulting in efficient data transfer between these components.

In order to accomplish this, the MCH clock master 120 of the MCH 111 receives a pair of MCH FSB differential clock signals 210 (e.g. 133 or 200 MHz). These clock signals are routed by the FSB 103 to the MCH 111 at the Host Phase Locked Loop (HPLL) 216 of the MCH clock master 120. The MCH clock master 120 uses the HPLL 216 to generate on die local synchronous clocks for the MCH 111, FSB 103, and for the Hub Link 122, as well as, the system memory 113. The HPLL 216 routes a system memory synchronous clock signal (e.g. 133 MHz) to the system memory 113 along line 219. Further, the MCH clock master 120 directly sends a raw copy of the MCH FSB differential clock signals 210 directly along line 221, bypassing the HPLL 216, to a Delayed Locked Loop (DLL) 218. The HPLL 216 also divides down the MCH FSB differential clock signals 210 to a predetermined clock frequency (e.g. 66 MHz) to create a local synchronous clock signal and sends this local synchronous clock signal along line 215 to the DLL 218 for comparison purposes, as will be discussed later.

The DLL 218 divides the MCH FSB differential clock signals 210 down to a predetermined clock frequency (e.g. 66 MHz) using frequency divider 220. Further, the DLL 218 adds a variable delay utilizing delay block 222 and then drives this signal, now termed a system clock signal, to the Hub Link 122 and, particularly, to the clock chip 204 of the Hub Link 122 along line 230. The system clock signal (e.g. 66 MHz) now serves as a source for all the relative frequency clock signals (e.g. 66 MHz and 33 MHz signals) that are used on the board and for all the common frequency board devices.

Particularly, the clock chip 204 receives the system clock signal (e.g. 66 MHz) and uses the system clock signal in a buffer mode to send matched versions of this clock signal (and other derivations) to all of the components on the board that require it (e.g. ICH 131 and AGP 141). For example, as shown in FIG. 2, a buffered system clock signal (e.g. 66 MHz) is sent along line 234 to the AGP 141. A buffered system clock signal (e.g. 66 MHz) is sent along line 231 to the ICH 131. Furthermore, the system clock signal is divided down by frequency divider 233 (e.g. down to 33 MHz) and sent along lines 235 to PCI slots 133 and along line 237 to the ICH 131. Also, it should be appreciated that a variety of other clocking signals are sent to the ICH 131 for use by the ICH 131, as shown in FIG. 2.

A copy of the system clock signal (e.g. 66 MHz) is also sent back from the external clock buffer chip 204 to the DLL 218 of the MCH clock master 120 along line 232. The DLL 218 of the MCH clock master 120 receives the return system clock signal from line 232 and compares it to the local synchronous clock signal received from the HPLL 216 along line 215 utilizing the phase comparator 224.

Based upon the phase difference of the two clock signals, the DLL 218 adjusts the phase of the outgoing system clock signal along line 230 utilizing the delay block 222 such that the outgoing system clock signal is aligned with (i.e. is in phase with) the internal local synchronous clock signal of the MCH clock master 120. In this way, the outgoing system clock signal (e.g. 66 MHz) along line 230 which is utilized by the Hub Link 122 is aligned with the internal local synchronous clock signal of the MCH, as well as, the FSB differential clock signals (e.g. 133 or 200 MHz) of the FSB 103 upon which the internal local synchronous clock signal of the MCH is based. Thus, in this example, the MCH clock master 120 is the clock master for the 66/33 MHz board clocks.

Accordingly, synchronous and phase aligned data transfer can be accomplished between the system memory 113 of the MCH 111, the ICH 131, and the AGP 141 as they are all based on a common clock, resulting in efficient data transfer between these components.

Figure 3:
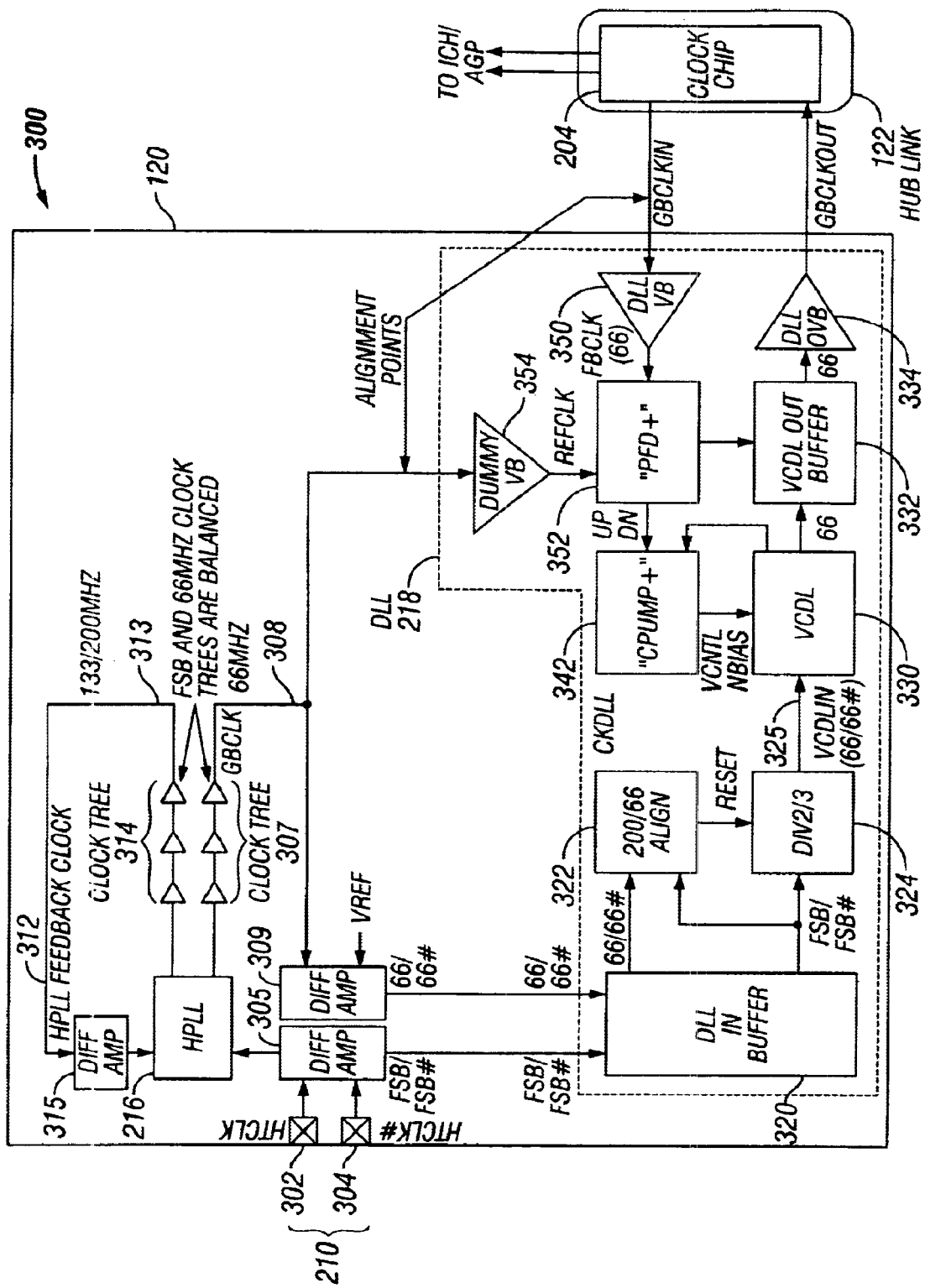
FIG. 3 illustrates a more detailed block diagram of the MCH clock master of FIG. 2, according to one embodiment of the invention.

With reference now to FIG. 3, FIG. 3 illustrates a more detailed block diagram of the MCH clock master 120 of FIG. 2, according to one embodiment of the invention. As previously discussed the MCH clock master 120 uses the FSB bus clock input to derive a local synchronous clock signal seed for the DLL 218. The FSB uses a differential clock pair for its timing reference. In this example, the MCH clock master 120 receives MCH FSB differential clock signals 210 (e.g. operating at 133 or 200 MHz), denoted in FIG. 3 as HTCLK and HTCLK# (Host Clock and Host Clock prime, respectively), at inputs 302 and 304, respectively. The MCH FSB differential clock signals 210 are fed into differential amplifier 305.

The differential amplifier 305 routes the MCH FSB differential clock signals 210 to HPLL 216. As previously discussed with reference to FIG. 2, the HPLL 216 performs frequency division on the FSB differential clock signals to generate a local synchronous clock signal which is routed to the DLL 218. As shown here in the more detailed diagram of FIG. 3, the local synchronous clock signal (e.g. 66 MHz) is routed through a clock tree 307 along line 308 to the DLL 218. Particularly, the local synchronous clock signal along line 315 is split into two different paths, one of which goes to differential amplifier 309 and the other of which goes to a dummy input buffer 354 of the DLL 218, which will be discussed later.

Looking at the feedback loop, the FSB differential clock signals are routed through HPLL feedback clock loop 312 back to HPLL 216 along line 313, including clock tree 314 and differential amplifier 315. Clock tree 314 and clock tree 307 are balanced with one another. The HPLL feedback clock loop 312 keeps the internal clock of HPLL 216 (based on the FSB differential clock signals) aligned with the local synchronous clock signal, which is routed along line 308.

Continuing with reference to FIG. 3, the FSB differential clock signals are transmitted from differential amplifier 305 to DLL input buffer 320. Similarly, differential local synchronous clock signals (e.g. 66 MHz) are transmitted from differential amplifier 309 to DLL input buffer 320. The DLL input buffer 320 receives these signals and then generates a local copy of the FSB differential clock signals and the differential local synchronous clock signals, respectively.

The first stage of the DLL 218 receives the FSB differential clock signals and the differential local synchronous clock signals and generates a divided clock signal (e.g. 66 MHz), aligned to the local synchronous clock, along the voltage controlled delay line 325. This is accomplished by using a phase discriminator 322 and a divide-by-⅔ counter 324. The phase discriminator 322 samples the differential local synchronous clock signals (e.g. 66 MHz) from the DLL input buffer 320 to determine when both clocks have aligned rising edges. The phase discriminator 322 then generates a reset pulse for the divider 324 such that the divider output can be aligned with the local synchronous clock. Accordingly, this mechanism allows for the divider output to be aligned (e.g. an FSB divided clock signal) with the local synchronous clock.

Particularly, the divide-by-⅔ counter 324 divides the FSB differential clock signal (e.g. 133 MHz or 200 MHz) down to a predetermined clock frequency and is aligned, as previously discussed, with the local synchronous clock. In the current example, the predetermined clock frequency is 66 MHz. The divider output is driven along the voltage controlled delay line 325 as the input to the voltage controlled delay (VCDL) 330. More particularly, this divider output (e.g. the FSB divided clock signal at 66 MHz) after various adjustments, as will be discussed, becomes the system clock signal that will be sent to the clock chip 204.

The VCDL 330 adds a variable delay to the divider output before sending this signal through the VCDL output buffer 332 and the DLL output buffer 334 and onto the Hub Link 122, as the system clock signal. Manipulating the VCDL reference voltage with the vcntrl bias signal from the charge pump 342 controls the delay through the VCDL 330.

Particularly, the voltage of the divider output is manipulated using the charge pump 342, which is responsive to a bias signal (e.g. up or down, + or −, etc.) from phase frequency detector (PFD) 352. The PFD 352 compares the feedback clock frequency of a received system clock signal (denoted as FBCLK) from the Hub link 122, which initially enters the DLL 218 at GBCLKN, and the local synchronous clock signal (denoted as REFCLK) received along line 308 from the HPLL 216 through dummy input buffer 354 of the DLL 218. The PFD compares the received system clock signal to the local synchronous clock signal to determine the degree to which the received system clock signal is out phase with the local synchronous clock signal. Based on this comparison, the PFD 352 sends a bias signal to the charge pump 342 to bias the VCDL 330 in order to adjust the phase of the system clock signal sent out to the Hub Link 122 and to the clock chip 204 such that the system clock signal is synchronized and aligned (i.e. in phase) with the local synchronous clock signal.

Further, the output of the VCDL 330 is translated from the core voltage of 1.2V or 3.3V across the DLL output buffer 334 and driven to the I/O pad denoted GBCLKOUT as the system clock signal. The system clock signal (e.g. 66 MHz) is routed to the external clock buffer chip 204, which buffers this signal and distributes the system clock signal (or variations thereof, e.g. 33 MHz) to the ICH, AGP, and other components (e.g. common frequency board devices), as previously discussed with reference to FIG. 2.

The DLL 218 receives a copy of the system clock signal (e.g. 66 MHz) operating at 3.3V back from the clock chip 204 at the I/O pad denoted GBCLKIN. The 3.3V system clock signal is converted to the 1.2V core voltage across the DLL input buffer 350 and then sent to the PFD 352. In order for the local synchronous clock to be skew balanced to the feedback system clock signal received at the I/O pad GBCLKIN, the local synchronous clock is sent through a dummy input buffer 354 that was particularly designed to match the delay of the DLL input buffer 350. The output of the dummy input buffer 354, e.g. the local synchronous clock, is then transmitted to the PFD 352.

As previously discussed, PFD 352 compares the feedback clock frequency of the received system clock signal from the external clock buffer chip 204 (denoted as FBCLK) and the local synchronous clock signal (denoted as REFCLK). In this example both the local synchronous clock and the feedback or received system clock signal are both operating at 66 MHz. The PFD 352 compares the received system clock signal to the local synchronous clock signal to determine the degree to which the received system clock signal is out phase with the local synchronous clock signal. Based on this comparison, the PFD 352 generates and transmits a bias signal to the charge pump 342 to bias the VCDL 330 in order to adjust the phase of the system clock signal sent out to the clock buffer chip 204 such that the system clock signal is synchronized and aligned (i.e. in phase) with the local synchronous clock signal.

In this way, the outgoing system clock signal (e.g. 66 MHz) utilized by the Hub Link 122 is aligned with the internal local synchronous clock signal of the MCH (e.g. 66 MHz), as well as, the FSB differential clock signals (e.g. 133 or 200 MHz) of the FSB upon which the internal local synchronous clock signal of the MCH is based. Thus, in this example, the MCH clock master 120 is the clock master for the 66/33 MHz board clocks. Traditionally, a dedicated clock chip generates this signal resulting in an asynchronous clocking relationship.

Accordingly, synchronous and phase aligned data transfer can be accomplished between the system memory of the MCH, the ICH, and the AGP along the Hub Link, as they are all based on a common clock, resulting in efficient data transfer between these components.

Moreover, the typical approach used by most MCH chips is to have separate asynchronous Hub and FSB clocks, each with its own PLL for external deskewing. Unfortunately, this approach leads to more complicated core logic designs and higher latency.

Embodiments of the invention, by integrating the clocks of the MCH, ICH, AGP, and other system devices into the same phase locked loop that generates the FSB and system memory (SM) clocks, allows for synchronous data transfers between devices on the Hub Link and system memory. For example, synchronous data transfers between the AGP and system memory can be obtained. This results in very efficient and reliable data transfer between the AGP and system memory for the speedy rendering graphics, which is very important for today's consumers of computer products. Furthermore, synchronous designs are much easier to code and much easier to validate. Moreover, the integration of the clocks of the MCH, ICH, AGP, and other system devices into the same phase locked loop that generates the FSB and system memory (SM) clocks, as opposed to using more clocks and phase locked loops, results in space savings on the die of the chip. These space savings can instead be used for other purposes.

Accordingly, embodiments of the invention allow for synchronous data transfers between the Hub Link, FSB, MCH, system memory, AGP, ICH, and other relative frequency devices on the board. This results in simpler logic design and lower latency in transfers between these domains. Due to the lower latency, performance is beneficially increased.

Moreover, while aspects of the invention and various functional components have been described in particular embodiments, it should be appreciated these aspects and functionalities can be implemented in hardware, software, firmware, middleware or a combination thereof.

Figure 4:
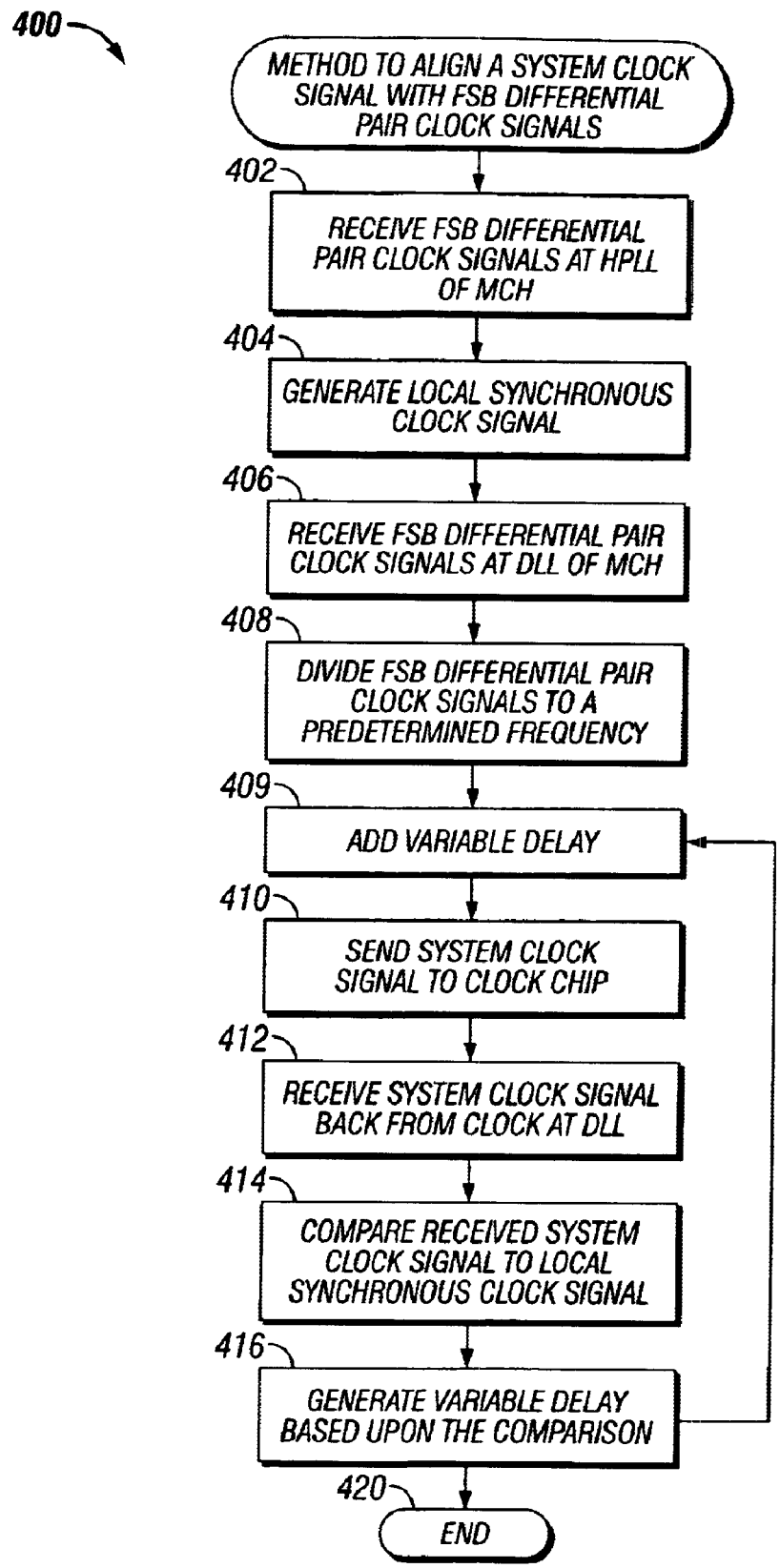
FIG. 4 illustrates a process to align a system clock signal with FSB differential pair clock signals according to one embodiment of the invention.

With reference now to FIG. 4, FIG. 4 illustrates a process 400 to align a system clock signal of a Hub Link with FSB differential pair clock signals of a FSB, according to one embodiment of the invention. Particularly, FIG. 4 illustrates a more general process to perform the functions as previously described in detail, with reference to the specific structures of FIGS. 2 and 3. At block 402, FSB differential pair clock signals are received at an HPLL of an MCH. A local synchronous clock signal for the MCH is then generated based upon the FSB differential pair clock signals (block 404). Further, at block 406, the FSB differential pair clock signals are also received at a DLL of the MCH. The FSB clock pair signals are then divided to a predetermined clock frequency (e.g. 66 MHz) (block 408) and a variable delay is added (block 409), as will be discussed.

Next, at block 410, a system clock signal is sent from the DLL to a clock buffer chip. The system clock signal is based on the divided down FSB clock signal. Then a copy of system clock signal is sent back from the clock chip to the DLL. The received system clock signal at the DLL is compared to the local synchronous clock signal to determine the degree to which the system clock signal is out of phase with the local synchronous clock signal (block 414). At block 416, a variable delay is generated based upon the phase comparison. The process 400 returns to block 409 to add the variable delay to the outgoing system clock signal such that the outgoing system clock signal is in phase with the local synchronous clock, thereby creating an internal feedback loop of the process 400. In this way, the outgoing system clock signal (e.g. 66 MHz) utilized by many system devices on the board is aligned in phase with the internal local synchronous clock signal of the MCH, as well as, the FSB differential clock signals of the FSB upon which the internal local synchronous clock signal of the MCH is based.

While embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A memory control hub (MCH) clock master comprising:
   a host phase locked loop (HPLL) of the MCH to receive a front-side bus (FSB) clock signal from a front-side bus and to generate a local synchronous clock signal for the MCH based upon the FSB clock signal; and
   a delayed lock loop (DLL) to receive the FSB clock signal and to generate a system clock signal, the DLL to synchronize the system clock signal to the local synchronous clock of the MCH and to drive the system clock signal to common frequency board devices.

2. The MCH clock master of claim 1, wherein, the HPLL generates the local synchronous clock signal by dividing the FSB clock signal down to a predetermined frequency.

3. The MCH clock master of claim 1, wherein, the DLL further comprises a frequency diver to divide down the FSB clock signal to a predetermined frequency to generate the system clock signal.

4. The MCH clock master of claim 1, wherein, to synchronize the system clock signal to the local synchronous clock signal, the DLL adds a variable delay to the system clock signal, the variable delay being based upon a comparison of a received system clock signal from an external clock buffer chip and the local synchronous clock signal.

5. The MCH clock master of claim 4, wherein, the DLL further comprises a phase comparator to compare the phase of the received system clock signal from the external clock buffer chip to the phase of the local synchronous clock signal in order to create a bias signal representative of the phase difference between the received system clock signal and the local synchronous clock signal for use by a delay, the delay to delay the system clock signal such that the system clock signal is synchronized with the local synchronous clock signal.

6. The MCH clock master of claim 1, wherein, the system clock signal is used by a clock chip.

7. The MCH clock master of claim 1, wherein, the system clock signal serves as a source for all relative frequency clock signals used on a board.

8. The MCH clock master of claim 1, wherein, the HPLL generates a system memory synchronous clock signal by dividing the FSB clock signal down to a predetermined frequency and routes the system memory synchronous clock signal to system memory.

9. A method comprising:
generating a local synchronous clock signal for a memory control hub (MCH) based upon a received front-side bus (FSB) clock signal;
generating a system clock signal based upon the received FSB clock signal;
synchronizing the system clock signal to the local synchronous clock of the MCH; and
driving the system clock signal to an external clock buffer chip and to common frequency board devices.

10. The method of claim 9, wherein, generating the local synchronous clock signal further comprises dividing the FSB clock signal down to a predetermined frequency.

11. The method of claim 9, wherein, generating the system clock signal further comprises dividing the FSB clock signal down to a predetermined frequency.

12. The method of claim 9, wherein, synchronizing the system clock signal to the local synchronous clock signal, further comprises adding a variable delay to the system clock signal, the variable delay being based upon a comparison of a received system clock signal from an external clock buffer chip and the local synchronous clock signal.

13. The method of claim 12, wherein, synchronizing the system clock signal to the local synchronous clock signal, further comprises comparing the phase of the received system clock signal from the external clock buffer chip to the phase of the local synchronous clock signal in order to create a bias signal representative of the phase difference between the received system clock signal and the local synchronous clock signal for use in delaying the system clock signal such that the system clock signal is synchronized with the local synchronous clock signal.

14. The method of claim 9, wherein, the system clock signal is used by the external clock buffer chip.

15. The method of claim 9, wherein, the system clock signal serves as a source for all relative frequency clock signals used on a board.

16. The method of claim 9, further comprising:
generating a system memory synchronous clock signal by dividing the FSB clock signal down to a predetermined frequency; and
routing the system memory synchronous clock signal to system memory.

17. A system comprising:
a processor coupled to a memory control hub (MCH) by a front-side bus (FSB), the FSB transmitting a FSB clock signal to calibrate transactions between the processor and the MCH;
an input/output control hub (ICH) coupled to the MCH by a Hub Link; and
an MCH clock master, including:
a host phase locked loop (HPLL) of the MCH to receive the FSB clock signal from the FSB and to generate a local synchronous clock signal for the MCH based upon the FSB clock signal; and
a delayed lock loop (DLL) to receive the FSB clock signal and to generate a system clock signal, the DLL to synchronize the system clock signal to the local synchronous clock of the MCH and to drive the system clock signal to an external clock buffer chip to calibrate the timing of transactions between the MCH and the ICH.

18. The system of claim 17, wherein, the HPLL generates the local synchronous clock signal by dividing the FSB clock signal down to a predetermined frequency.

19. The system of claim 17, wherein, the DLL further comprises a frequency diver to divide down the FSB clock signal to a predetermined frequency to generate the system clock signal.

20. The system of claim 17, wherein, to synchronize the system clock signal to the local synchronous clock signal, the DLL adds a variable delay to the system clock signal, the variable delay being based upon a comparison of a received system clock signal from the external clock buffer chip and the local synchronous clock signal.

21. The system of claim 20, wherein, the DLL further comprises a phase comparator to compare the phase of the received system clock signal from the external clock buffer chip to the phase of the local synchronous clock signal in order to create a bias signal representative of the phase difference between the received system clock signal and the local synchronous clock signal for use by a delay, the delay to delay the system clock signal such that the system clock signal is synchronized with the local synchronous clock signal.

22. The system of claim 17, wherein, the system clock signal is used by the external clock buffer chip.

23. The system of claim 17, wherein, the system clock signal serves as a source for all relative frequency clock signals used on a board.

24. The system of claim 17, wherein, the HPLL generates a system memory synchronous clock signal by dividing the FSB clock signal down to a predetermined frequency and routes the system memory synchronous clock signal to system memory.

* * * * *